United States Patent
Tsujimoto

(10) Patent No.: US 9,554,008 B2
(45) Date of Patent: Jan. 24, 2017

(54) MULTIFUNCTION PERIPHERAL, MULTIFUNCTION PERIPHERAL CONTROLLING SYSTEM, AND METHOD FOR CONTROLLING MULTIFUNCTION PERIPHERAL

(75) Inventor: Kunihiko Tsujimoto, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 574 days.

(21) Appl. No.: 13/448,736

(22) Filed: Apr. 17, 2012

(65) Prior Publication Data

US 2012/0287452 A1    Nov. 15, 2012

(30) Foreign Application Priority Data

May 13, 2011   (JP) ................................. 2011-108789

(51) Int. Cl.
  G06F 3/12      (2006.01)
  G06K 15/02     (2006.01)
  H04N 1/00      (2006.01)

(52) U.S. Cl.
  CPC ...... *H04N 1/00973* (2013.01); *H04N 1/00244* (2013.01); *H04N 1/00278* (2013.01); *H04N 1/00411* (2013.01); *H04N 1/00424* (2013.01); *H04N 1/00432* (2013.01); *H04N 1/00464* (2013.01); *H04N 1/00474* (2013.01); *H04N 1/00482* (2013.01); *H04N 2201/0039* (2013.01); *H04N 2201/0094* (2013.01)

(58) Field of Classification Search
  USPC ....... 358/1.18, 1.9, 1.13, 1.8, 1.15; 707/7.81
  See application file for complete search history.

(56) References Cited

U.S. PATENT DOCUMENTS

| | | |
|---|---|---|
| 5,422,993 A | 6/1995 | Fleming |
| 5,950,045 A | 9/1999 | Nomura et al. |
| 6,421,509 B1 | 7/2002 | Nomura et al. |
| 7,096,265 B2 | 8/2006 | Simpson et al. |
| 7,814,236 B2 | 10/2010 | Tsujimoto |
| 7,859,694 B2 | 12/2010 | Inada |

(Continued)

FOREIGN PATENT DOCUMENTS

| | | |
|---|---|---|
| CN | 101056346 A | 10/2007 |
| JP | 04-296965 A | 10/1992 |

(Continued)

OTHER PUBLICATIONS

Related U.S. Appl. No. 13/251,372, filed Oct. 3, 2011.

(Continued)

*Primary Examiner* — Vincent Rudolph
*Assistant Examiner* — Marchelle L Taggart
(74) *Attorney, Agent, or Firm* — Renner, Otto, Boisselle & Sklar, LLP

(57) ABSTRACT

A web browser section makes, to a second web server section, a request for acquisition of operation screen data of an application program executed in an information processing device, when an instruction to activate the application program is received. The second web server section transmits the operation screen data of the application program to the web browser section in accordance with and in response to the request for acquisition. The displaying section displays an operation screen in accordance with the operation screen data obtained by the web browser section from the second web server section.

4 Claims, 9 Drawing Sheets

(56) References Cited

U.S. PATENT DOCUMENTS

| | | | |
|---|---|---|---|
| 8,176,075 B2* | 5/2012 | Kuroyanagi | 707/781 |
| 8,325,354 B2* | 12/2012 | Yoshida et al. | 358/1.13 |
| 2002/0004802 A1 | 1/2002 | Shima | |
| 2002/0147661 A1 | 10/2002 | Hatakama et al. | |
| 2002/0171681 A1 | 11/2002 | Nomura et al. | |
| 2005/0046887 A1 | 3/2005 | Shibata et al. | |
| 2007/0165265 A1 | 7/2007 | Ito et al. | |
| 2007/0182986 A1 | 8/2007 | Ciriza et al. | |
| 2007/0268517 A1 | 11/2007 | Koarai | |
| 2008/0123127 A1 | 5/2008 | Okamoto et al. | |
| 2008/0150952 A1 | 6/2008 | Koarai | |
| 2010/0073701 A1 | 3/2010 | Okada et al. | |
| 2011/0102827 A1 | 5/2011 | Nishino et al. | |

FOREIGN PATENT DOCUMENTS

| | | |
|---|---|---|
| JP | 10-326288 A | 12/1998 |
| JP | 11-231729 | 8/1999 |
| JP | 2000-092257 A | 3/2000 |
| JP | 2001-127986 A | 5/2001 |
| JP | 2001-154773 A | 6/2001 |
| JP | 2002-300338 A | 10/2002 |
| JP | 2002-344682 A | 11/2002 |
| JP | 2003-032413 A | 1/2003 |
| JP | 2003-150484 A | 5/2003 |
| JP | 2003-308195 | 10/2003 |
| JP | 2005-045370 A | 2/2005 |
| JP | 2005-080018 A | 3/2005 |
| JP | 2005-102044 A | 4/2005 |
| JP | 2005-346739 A | 12/2005 |
| JP | 2006-203870 A | 8/2006 |
| JP | 2006-237705 A | 9/2006 |
| JP | 2007-174400 A | 7/2007 |
| JP | 2008-003833 A | 1/2008 |
| JP | 2008-131388 A | 6/2008 |
| JP | 2008-139981 A | 6/2008 |
| JP | 2008-199151 A | 8/2008 |
| JP | 2008-287531 A | 11/2008 |
| JP | 2009-208430 A | 9/2009 |
| JP | 2010-74573 A | 4/2010 |
| JP | 2011-096098 A | 5/2011 |
| JP | 2011-097454 A | 5/2011 |

OTHER PUBLICATIONS

Related U.S. Appl. No. 13/234,469, filed Sep. 16, 2011.
Office Action mailed on Jan. 31, 2013 for related U.S. Appl. No. 13/251,372.
Office Action mailed on Feb. 1, 2013 for related U.S. Appl. No. 13/234,469.
Office Action mailed on Jan. 4, 2012 for related U.S. Appl. No. 12/073,442, now U.S. Pat. No. 8,325,354 issued on Dec. 4, 2012.
Advisory Action for related U.S. Appl. No. 13/234,469 mailed on Dec. 11, 2013.
Office Action for related U.S. Appl. No. 13/234,469 mailed on May 15, 2014.
Advisory Action for related U.S. Appl. No. 13/251,372 mailed on Jan. 16, 2014.
Office Action for related U.S. Appl. No. 13/234,469 mailed on Sep. 17, 2013.
Office Action for related U.S. Appl. No. 13/251,372 mailed on Sep. 27, 2013.

* cited by examiner

FIG. 7

```
<html>
  <head>
    <script type="text/javascript">
      function requestFileList(){
        var element = document.createElement('script');
        element.setAttribute('type', 'text/javascript');
        element.setAttribute('src', 'http://example.com/app/getFileList);
        document.getElementsByTagName('head')[0].appendChild(element);
      } function updateList(data){
        //parse data here and update status on UI
      } function WindowOnLoad(){
        requestFileList();
      }
    </script>
  </head>
  <body>
    <form id="ListForm" method="POST">
      <!-- UI contents is arranged by updateList function. -->
    </form>
  </body>
</html>
```

MULTIFUNCTION PERIPHERAL, MULTIFUNCTION PERIPHERAL CONTROLLING SYSTEM, AND METHOD FOR CONTROLLING MULTIFUNCTION PERIPHERAL

This Nonprovisional application claims priority under 35 U.S.C. §119 on Patent Application No. 2011-108789 filed in Japan on May 13, 2011, the entire contents of which are hereby incorporated by reference.

TECHNICAL FIELD

The present invention relates to (i) a multifunction peripheral controlling system in which a multifunction peripheral and an information processing device, which are connected with each other via the communications network so as to communicate with each other, operate in collaboration with each other, (ii) a method for controlling the multifunction peripheral, and (iii) the multifunction peripheral used in the multifunction peripheral controlling system.

BACKGROUND ART

Conventionally, a multifunction peripheral has been known which is equipped with a plurality of device functions such as a copying function, a scanning function, printing function, and a FAX transmission and reception function. In recent years, the multifunction peripheral has been connected, via a communications network, to information processing devices such as a PC (personal computer) and a server device, and has been performing various processes. That is, an application that operates on an information processing device and a function of the multifunction peripheral are caused to cooperate, so that the multifunction peripheral is caused to operate as a part of a total application system. This makes it possible to create easily a flexible service obtained by appropriately combining a function of the multifunction peripheral and a function of the information processing device.

For example, Patent Literature 1 discloses a multifunction peripheral that (i) receives, from an external PC, data containing a request for process related to an image processing and (ii) controls a device function in accordance with the data. According to Patent Literature 1, an external API section included in the multifunction peripheral (i) converts the data, received from the external PC and containing the request for process, into a command compatible with an API (Application Program Interface) of a control layer of the multifunction peripheral and (ii) provides the command to the control layer.

Patent Literature 2 discloses a multifunction peripheral controlling system including a multifunction peripheral and a control device which transmits a control instruction to the multifunction peripheral, via a communications network. In the multifunction peripheral controlling system, data on an operation screen is transmitted from the control device to the multifunction peripheral by use of HTTP. The control device transmits a control command to the multifunction peripheral by use of SOAP in accordance with an instruction inputted to the operation screen. The multifunction peripheral carries out a function in accordance with the control command.

CITATION LIST

Patent Literature

Patent Literature 1
Japanese Patent Application Publication, Tokukai, No. 2005-80018 A (Publication Date: Mar. 24, 2005)

Patent Literature 2
Japanese Patent Application Publication, Tokukai, No. 2007-174400 A (Publication Date: Jul. 5, 2007)

SUMMARY OF INVENTION

Technical Problem

However, both the techniques disclosed in Patent Literature 1 and 2 face such a problem that time required until the operation screen is displayed is long as compared with a case in which an image corresponding to operation screen data stored in the multifunction peripheral is displayed in a displaying section.

That is, according to Patent Literature 1 and 2, (i) operation screen data is transmitted from the external device (PC, control device) to the multifunction peripheral and (ii) the multifunction peripheral displays an operation screen in accordance with the operation screen data received from the external device. As such, it takes time to download the operation screen data from the external device. This increases the time required until the operation screen is displayed. In a case where the operation screen is constituted by a plurality of partial images, a plurality of communication sessions are necessary in order to obtain the respective plurality of partial images. This further increases the time required until the operation screen is displayed.

By causing the application of the external device to operate on the multifunction peripheral, it is possible to shorten time taken in communication of the operation screen data. In this case, however, it is necessary that a process (e.g., image processing and image editing) to be carried out by the application be executed in a CPU of the multifunction peripheral. However, the CPU in the multifunction peripheral generally has a lower processing power than that of the external device such as a PC. Because of this, in a case where the process to be carried out by the application of the external device is executed in the CPU of the multifunction peripheral, time required for the process undesirably increases.

The present invention is accomplished in view of the foregoing problem. An object of the present invention is to cause an operation screen of an application operating on an information processing device to be displayed quickly in a multifunction peripheral, in a multifunction peripheral controlling system in which the multifunction peripheral and the information processing device cooperate so as to control an operation of the multifunction peripheral.

Solution to Problem

In order to attain the object, a multifunction peripheral of the present invention is a multifunction peripheral having a plurality of device functions and being connected to an information processing device via a communication network so as to communicate with the information processing device, the information processing device including a first web server section and an external application section which executes an application program, including: a displaying section for displaying an operation screen in accordance with operation screen data; an operation input section for receiving an instruction input from a user; a second web server section; a storage section for storing operation screen data of the application program executed in the information processing device; a web browser section; and a device control section for controlling an operation of each of the plurality of device functions, the web browser section making, to the second web server section, a request for acquisition of the operation screen data of the application program executed in the information processing device, when the operation input section receives an instruction to activate the application program, the second web server section (i) reading, from the storage section, the operation screen data of the application program in accordance with the request for acquisition and (ii) transmitting the operation screen data of the application program to the web browser section in response to the request for acquisition, the displaying section displaying an operation screen in accordance with the operation screen data obtained by the web browser section from the second web server section.

Advantageous Effects of Invention

According to the configuration, even in a case where the application program executed in the external application section in the information processing device is utilized in the multifunction peripheral, operation screen data of the application can be obtained from the storage section in the multifunction peripheral itself, not from the information processing device. This reduces time required until an operation screen is displayed, so that the operation screen can be displayed quickly.

BRIEF DESCRIPTION OF DRAWINGS

FIG. 7 is an explanatory view illustrating an example of basic information of an operation screen, which basic information is stored in an external application UI storage section of a multifunction peripheral illustrated in FIG. 1.

DESCRIPTION OF EMBODIMENTS

The following description will discuss an embodiment of the present invention.

(1-1. General Configuration of Multifunction Peripheral Controlling System 1)

Figure 1:
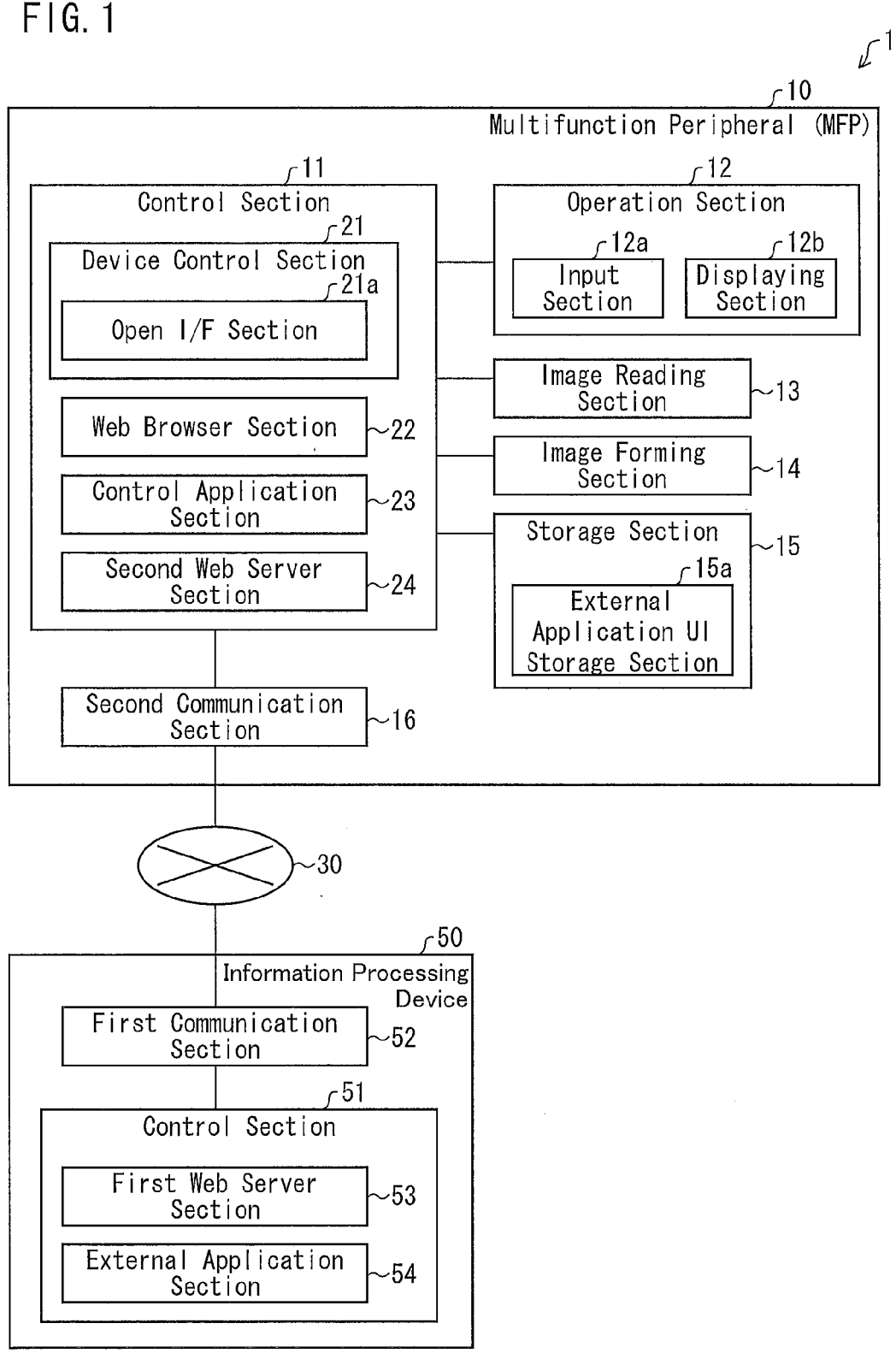
FIG. 1 is an explanatory view illustrating a configuration of a multifunction peripheral and a multifunction peripheral controlling system in accordance with an embodiment of the present invention.

FIG. 1 is an explanatory view illustrating a configuration of a multifunction peripheral controlling system 1 in accordance with the present embodiment. As illustrated in FIG. 1, the multifunction peripheral controlling system 1 includes a multifunction peripheral (MFP; multifunction peripheral) 10 and an information processing device (server device) 50. The devices (the multifunction peripheral 10 and the information processing device 50) are connected to each other via a communications network 30 so as to communicate with each other. Note that more than one multifunction peripheral 10 can be included in the multifunction peripheral controlling system 1, and more than one information processing device 50 can be included in the multifunction peripheral controlling system 1.

The communications network 30 can be, (i) wired communications such as IEEE1394, USB, a power-line carrier, a CATV line, a telephone line, ADSL, or a serial cable and (ii) wireless communications such as infrared communication by means of IrDA or remote control, Bluetooth®, 802.11 wireless, HDR, a mobile phone network, a satellite circuit, or a terrestrial digital network. The multifunction peripheral 10 and the information processing device 50 communicate with each other by use of a HTTP (Hyper Text Transfer Protocol) method. HTTP is a protocol used in communications (e.g., request and transmission of a web page) between a web server and a web browser.

(1-2. Configuration of Multifunction Peripheral 10)

The multifunction peripheral 10 is a digital multifunction peripheral or an analogue multifunction peripheral, which (i) receives, by use of HTTP, control information in HTML format from the information processing device 50 and (ii) carries out various device functions of the multifunction peripheral 10 in accordance with received control information. Examples of the device functions encompass a scanning function, a printing function, a copying function, a facsimile transmission and reception function, and a communication function. Note that the device functions of the multifunction peripheral 10 are not limited to the above functions. For example, the multifunction peripheral 10 can be a multifunction peripheral that is not equipped with one or more of the above functions. The multifunction peripheral 10 can also be a multifunction peripheral that is equipped with other device functions, in place of some of the above functions or in addition to the above functions.

The multifunction peripheral 10 includes a control section (image generation section) 11, an operation section 12, an image reading section 13, an image forming section 14, a storage section 15, and a second communication section 16. The control section 11 includes a device control section (image generation section) 21, a web browser section 22, a control application section 23, and a second web server section 24. The storage section 15 includes an external application UI storage section 15a.

The operation section 12 is a user interface which notifies a user of various types of information and receives an input from the user. The operation section 12 includes (i) an input section (operation input section) 12a including various input keys and (ii) a displaying section 12b such as an LCD (Liquid Crystal Display). Note that the operation section 12 can be a touch panel into which the input section 12a and the displaying section 12b are integrated.

The image reading section 13 includes (i) a scanner and (ii) a document conveying section for conveying a document to a position of the scanner. The image reading section 13 carries out a scanning function of reading, as image data, a text or an image which are printed on the document. The image reading section 13 reads the image in predetermined resolution.

The image forming section 14 is for printing, on a recording sheet such as a printing paper, an image (text/ photograph/graphic) corresponding to inputted image data. The image forming section 14 includes a photoreceptor drum, a charging device, an exposure device, a developing device, transfer device, a fixing device, a sheet tray, and the like. Specifically, the image forming section 14 carries out (i) a copying function of printing image data inputted from the image reading section 13 and (i) a printer function of printing image data inputted from an external device.

The second communication section 16 is a communications interface which communicates with the external device such as the information processing device 50, via the communications network 30. As described above, the second communication section 16 communicates with the information processing device 50 by use of HTTP in the present embodiment. The second communication section 16 can also access the second web server section 24 inside the multifunction peripheral 10, in a case where the IP address of the multifunction peripheral 10 itself is shown as an access destination.

The control section 11 is a computer device constituted by (i) an arithmetic processing section (not shown) such as a CPU and a dedicated processor and (ii) a storage section (not shown) such as a RAM, a ROM, and an HDD. The control section 11 realizes a function of the device control section 21, a function of the web browser section 22, a function of the control application section 23, and a function of the second web server section 24 by (i) reading out (a) various types of information stored in the storage section and (b) programs, stored in the storage section, for carrying out various controls and (ii) executing the programs.

The web browser section 22 carries out an operation in accordance with software for viewing a web page. The software can be widely used software for a web browser. The web browser section 22 can communicate, via the second communication section 16, not only with the first web server section 53 included in the information processing device 50 but also with the second web server section 24 inside the multifunction peripheral 10.

The second web server section 24 operates in accordance with widely used software for a web server. Note that the web server is software that provides a function of an information processing device constituting WWW (World Wide Web), which is an information system on the Internet. The second web server section 24 receives a request (HTTP request) from the web browser section 22, causes an application to be executed in accordance with the request, and responds (HTTP response) to the web browser section 22.

The control application section 23 carries out a process in accordance with a web application that operates on a web server. In a case where any of various functions (e.g., a copying function) of the multifunction peripheral 10 needs to be controlled, the control application section 23 transmits, to the device control section 21, a control command for controlling the function. The control application section 23 controls the web browser section 22 in accordance with the control command, thereby carrying out a communication control so as to transmit, to the first web server section 53, unique information unique to the multifunction peripheral 10. This allows the function of the multifunction peripheral 10 to be controlled.

The storage section 15 is storing means for storing various data (basic operation screen data, operation screen data for a unique operation mode, various look-up tables, and the like) handled in the multifunction peripheral 10. A configuration of the storage section 15 is not limited to a specific one. The storage section 15 can be, for example, a hard disk. The storage section 15 includes an external application UI storage section 15a. In the external application UI storage section 15a, UI (user interface) data such as operation screen data corresponding to the external application section 54 of the information processing device 50 is stored. The operation screen data can be web page data indicating content to be displayed on an operation screen. The operation screen data can also be data containing (i) display format information, which is information indicating a display format of the operation screen and (ii) request destination information for requesting another device to transmit generation condition information, which is information indicating at least some of conditions for generating the operation screen.

The device control section 21 controls the various functions of the multifunction peripheral 10. That is, the device control section 21 controls an operation of each of the image reading section 13, the image forming section 14, the second communication section 16, the operation section 12, and the like. For example, the device control section 21 controls an operation of the image reading section 13 so as to obtain data of a scanned image. The device control section 21 controls an operation of the image forming section 14 so as to form (output) an image on a recording material in accordance with image data. Further, the device control section 21 uses the second communication section 16 so as to carry out (i) a process of storing inputted image data into a specified external resource, (ii) a process of attaching inputted image data to an email and transmitting the email with the inputted image data to a specified address.

The device control section 21 has a unique operation mode and a collaborative operation mode. In a normal circumstance (e.g., right after the multifunction peripheral 10 is turned on), the device control section 21 causes the displaying section 12b to display a basic operation screen in accordance with the basic operation screen data stored in the storage section 15. The device control section 21 selects the unique operation mode or the collaborative operation mode in accordance with an instruction to select a mode, which instruction is inputted to the basic operation screen by the user. Alternatively, the device control section 21 selects either an application belonging to the unique operation mode or an application (external application) belonging to the collaborative operation mode.

Figure 2:
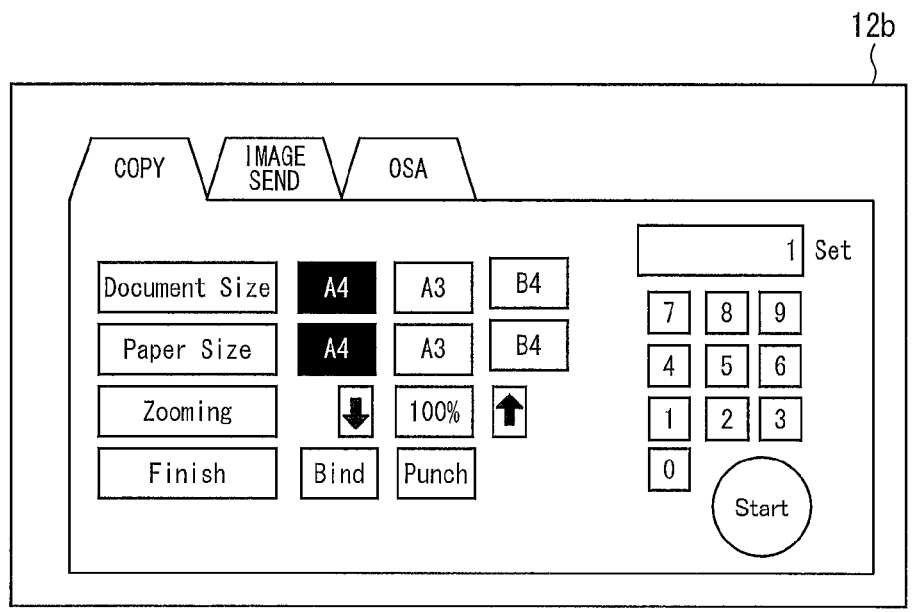
FIG. 2 is an explanatory view illustrating an example of an operation screen displayed in a displaying section of a multifunction peripheral illustrated in FIG. 1.

FIG. 2 is an explanatory view illustrating an example of the basic operation screen displayed in the displaying section 12b of the multifunction peripheral 10 in the normal circumstance (e.g., right after power is turned on). In the basic operation screen, it is possible to select from three tags "COPY," "IMAGE SEND," and "OSA" as illustrated in FIG. 2. Among them, "COPY" and "IMAGE SEND" are for the unique operation mode. "COPY" is a tab for selecting the copying function in which an image read from a document by means of the image reading section 13 is printed on a recording material. "IMAGE SEND" is a tab for selecting an image reading and transmitting function in which an image read from a document by means of the image reading section 13 is transmitted to another device. "OSA" stands for "SHARP OSA® (Sharp Open Systems Architecture)" and is for the collaborative operation mode.

The unique operation mode is a mode unique to the multifunction peripheral 10. In the unique operation mode, an operation screen stored in advance in the storage section 15 is displayed in the displaying section 12b in accordance with operation screen data for the unique operation mode. Various functions of the multifunction peripheral 10 are controlled on the basis of a control command, which is stored in the multifunction peripheral 10, in accordance with an instruction inputted to the operation screen by the user.

During the unique operation mode, the device control section 21 also carries out a control so as to, for example, (i) appropriately combine pieces of image information, which correspond to parts (component images, partial images) and are stored in the storage section 15, in accordance with a current configuration of or a current state of the multifunction peripheral 10 and (ii) cause a combined image information to be displayed on the operation screen. Note that the unique operation mode is a mode generally employed in conventional multifunction peripherals and therefore will not be described in detail.

In the collaborative operation mode, an operation screen is displayed in the displaying section 12b in accordance with operation screen data (operation screen data for the collaborative operation mode) stored in advance in the storage section 15. A control instruction is obtained, from the external application section 54 operating in the information processing device 50, in accordance with an instruction inputted to the operation screen by the user. Various functions of the multifunction peripheral 10 are controlled in accordance with the control instruction.

Figure 3:
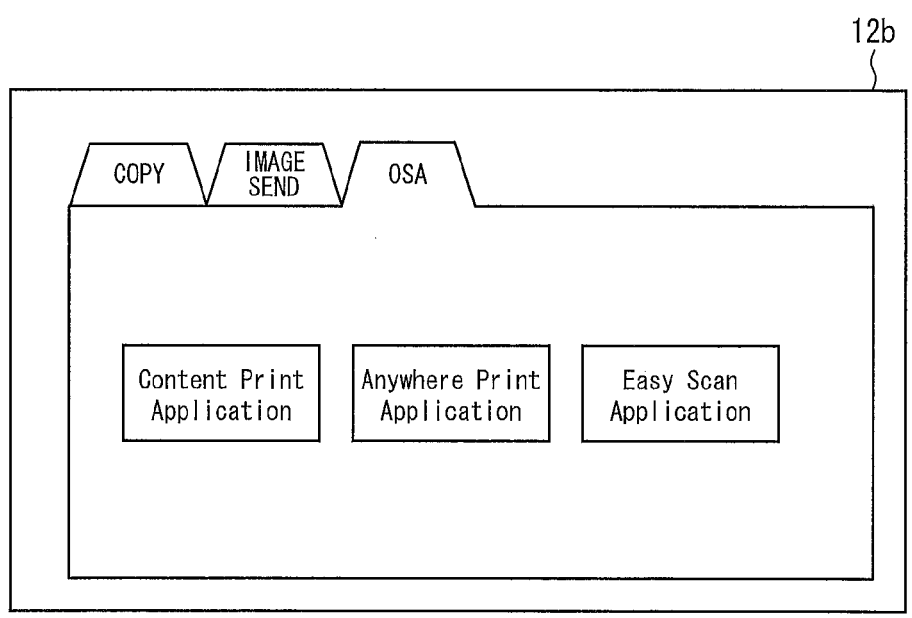
FIG. 3 is an explanatory view illustrating an example of an operation screen displayed in a displaying section of a multifunction peripheral illustrated in FIG. 1.

FIG. 3 is an explanatory view illustrating an example of an operation screen that is displayed in a case where the "OSA" tab is selected in the basic operation screen illustrated in FIG. 2. In the present embodiment, three applications (external applications) "Content print application," "Anywhere print application," and "Easy scan application" are registered as applications for the collaborative operation mode, as illustrated in FIG. 2.

In operation screen data corresponding to the operation screen illustrated in FIG. 3, information indicating an access destination to be accessed in order to obtain operation screen data of each of the applications is associated with a corresponding one of operation buttons for selecting the respective applications. The information indicating the access destination can be, for example, information obtained by adding, to a loopback address, a path corresponding to the corresponding one of the operation buttons (in the present embodiment, 127.0.0.1/print/contentsprint). When one of the operation buttons is selected, the web browser section 22 accesses an access destination (in the present embodiment, an access destination, in the second web server section 24, to be accessed in order to obtain the operation screen data) corresponding to the information associated with a selected operation button. By accessing the access destination, the web browser section 22 obtains, from the second web server section 24, the operation screen data of the application which has been selected. The web browser section 22 notifies the control application section 23 of obtained operation screen data. The control application section 23 notifies the device control section 21 of a control command for causing an operation screen to be displayed in the displaying section 12b in accordance with the operation screen data. This causes the operation screen to be displayed in the displaying section 12b. In the collaborative operation mode, the web browser section 22 (i) obtains, from the first web server section 53 in the information processing device 50 or the second web server section 24 in the multifunction peripheral 10, a control instruction in accordance with the instruction inputted to the operation screen by the user and (ii) notifies the control application section 23 of the control instruction. The control application section 23 notifies the device control section 21 of a control command in accordance with the control instruction received from the web browser section 22. The device control section controls the device functions of the multifunction peripheral 10 in accordance with the control command.

Note that a loopback address is a virtual IP address allocated to a loopback interface such as a network card (hardware functioning as, for example, a communication section) and indicates a device in which the loopback interface is provided. The loopback address is a publicly known address used in a widely used web browser. Use of a loopback address so as to access an address of the multifunction peripheral 10 (device in which a loopback interface is provided) to thereby obtain operation screen data eliminates the need of transmitting packet data to the outside of the multifunction peripheral 10. Also eliminated are the needs of (i) accessing a DNS (Domain Name System) server which carries out name resolution for finding an address, (ii) carrying out a communication for obtaining HTML data from the information processing device 50, and the like. This allows an operation screen to be displayed quickly as compared with a case in which operation screen data is obtained from another device via a communications network.

The device control section 21 includes an Open I/F section 21a capable of receiving a control command that does not depend on a model of the multifunction peripheral 10. The Open I/F section 21a discloses, to the control application section 23, a control command for controlling the various functions of the multifunction peripheral 10. The Open I/F section 21a receives a control command from the control application section 23 and converts a received control command into a command that can be recognized by the device control section 21.

The Open I/F section 21a includes a conversion table storage section (not shown) for storing a conversion table in which the control command disclosed to the outside and the command that can be recognized by the device control section 21 are associated with each other. The Open I/F section 21a converts a command in accordance with the conversion table.

As described above, the Open I/F section 21a can receive the control command, which can be shared by multifunction peripherals 10 irrespective of models of the respective multifunction peripherals 10. This allows the web application for causing the control application section 23 to operate can be shared by the multifunction peripherals 10. Accordingly, in a case where the control application section is caused to operate in accordance with a new web application, it is only necessary to install the same web application to the multifunction peripherals 10 without changing web applications depending on the multifunction peripheral 10. This can facilitate development of a web application for causing the control application section 23 to operate.

(1-3. Configuration of Information Processing Device 50)

The information processing device 50 includes a first communication section 52 and a control section 51 as illustrated in FIG. 1. The control section 51 includes the first web server section 53 and the external application section 54.

The control section 51 is a computer device constituted by (i) an arithmetic processing section (not shown) such as a CPU and a dedicated processor, (ii) a storage section (not shown) such as a RAM, a ROM, and an HDD, and the like. The control section 11 realizes a function of the first web server section 53 and a function of the external application section 54 by (i) reading (a) various types of information stored in the storage section and (b) programs, stored in the storage section, for carrying out various controls and (ii) executing the programs.

The first communication section 52 communicates with the multifunction peripheral 10, via a LAN, an Internet connection, or the like. The first communication section 52 communicates with the multifunction peripheral 10 by use of HTTP, as a communication protocol. In this way, the information processing device 50 functions as a web server device for one or more multifunction peripherals 10.

The first web server section 53 operates in accordance with software for a web server. The first web server section 53 has a function of (i) receiving, via the first communication section 52, a request (HTTP request) from the multifunction peripheral 10 and (ii), in response, transmitting a file, image data, print data, control information, or the like to the multifunction peripheral 10 via the first communication section 52 in accordance with the request.

The external application section 54 operates in accordance with a predetermined web application, in accordance with an instruction from the first web server section 53. That is, the external application section 54 is configured to operate in accordance with various web applications which operate on a web server. Note that examples of the web applications encompass an application written in JavaScript® and operating in a JavaScript® execution environment provided on the web server.

For example, in a case where the request from the multifunction peripheral 10 is a request for transmission of a print data file, the external application section 54 operates in accordance with a printing application. Specifically, the external application section 54 (i) obtains print data having a specified file name from a folder having a folder name that is indicated by the request for transmission and (ii) notifies the first web server section 53 of the print data. In a case where the request from the multifunction peripheral 10 is a request for transmission of a list of available print data files, the external application section 54 (i) obtains a list of print data files that can be currently provided to the multifunction peripheral 10 and (ii) notifies the first web server section 53 of the file list.

(1-4. Operation of Collaborative Operation Mode)

Figure 4:
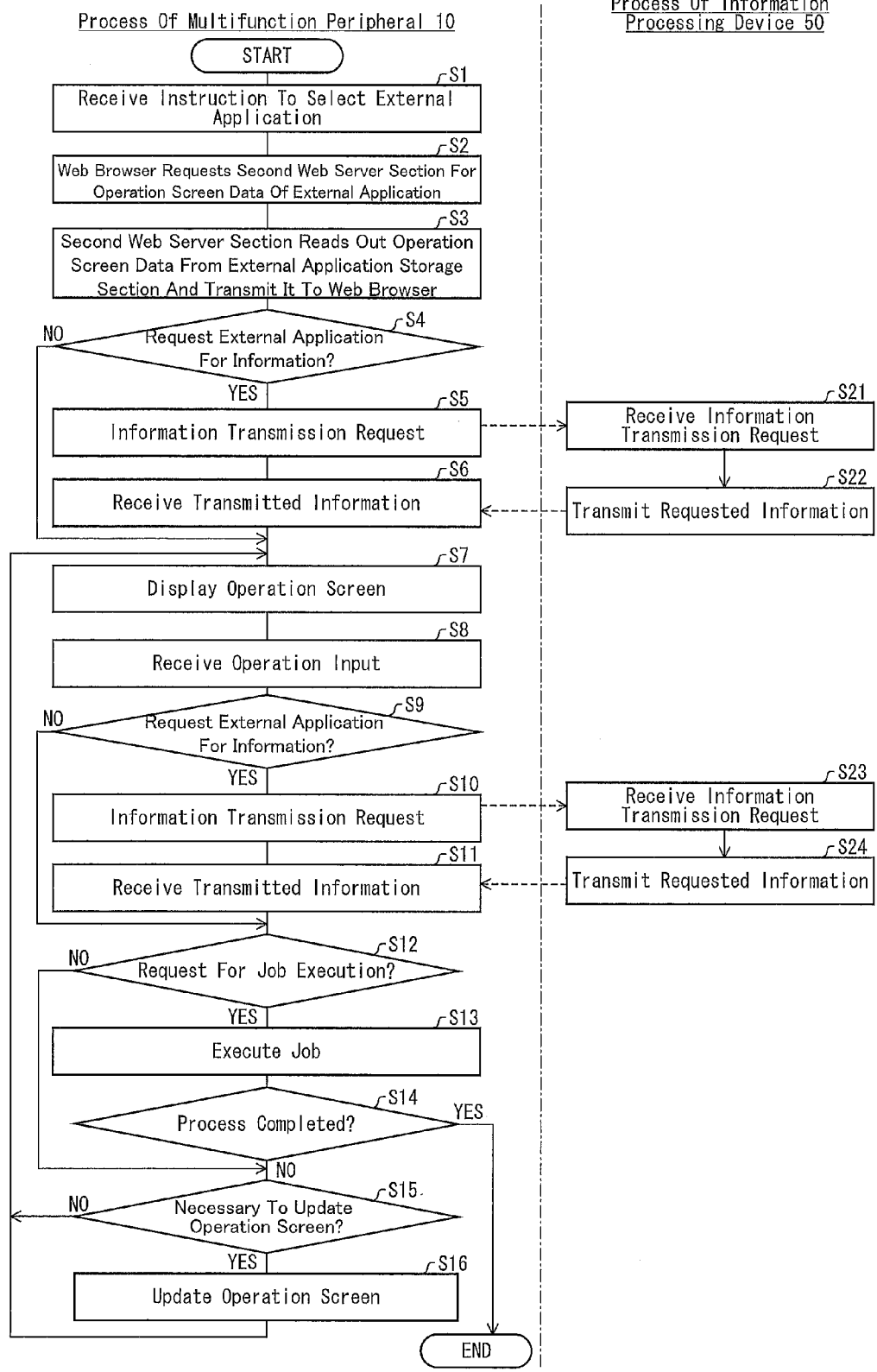
FIG. 4 is a flow chart showing a flow of processes in a multifunction peripheral controlling system illustrated in FIG. 1.

Next, the following description will discuss a process carried out in a case where the collaborative operation mode, in which the multifunction peripheral 10 and the information processing device 50 carry out a process in collaboration with each other, is selected. FIG. 4 is a flow chart showing a flow of a process (process carried out in a state where the operation screen illustrated in FIG. 3 is displayed after the "OSA" tab was selected in the basic operation screen illustrated in FIG. 2) carried out in a case where the collaborative operation mode is selected.

First, when an instruction to select an application (external application) of the collaborative operation mode is inputted to the input section 12a in the operation screen illustrated in FIG. 3 (S1), the device control section 21 activates the web browser section 22. The web browser section 22 (i) accesses a URL associated with an operation button selected in S1 and (ii) make a request for transmission of operation data of the application which has been selected (S2).

In the present embodiment, a loopback address and a path, in the second web server section 24, for obtaining the operation screed data of the application selected by the user are set as the URL. As such, the web browser section 22 transmits, to the second web server section 24 via the second communication section 16, an HTTP Get command for making a request for transmission of the operation screen data. The second web server section 24 (i) reads, from the external application UI storage section 15a, operation screen data corresponding to the Get command and (ii) transmits the operation screen data to the web browser section 22 (S3).

Next, the web browser section 22 determines (S4), on the basis of the operation screen data obtained from the second web server section 24, whether or not it is necessary to obtain information (generation condition information, which is information indicating at least some of conditions for generating the operation screen) from the external application section 54 in order to display the operation screen.

That is, in the present embodiment, an application can be classified into (i) an application whose operation screen can be displayed solely on the basis of web page data of the operation screen stored in the external application UI storage section 15a or (ii) an application whose operation screen is displayed on the basis of (a) web page data of the operation screen stored in the external application UI storage section 15a and (b) generation condition information obtained from the information processing device 50. In a case of the application (ii), the operation screen data stored in the external application UI storage section 15a is web page data (HTTP data) which indicates (a) display format information, which is information indicating a display format of the operation screen and (b) request destination information for requesting another device (typically, the information processing device 50), which is connected to the multifunction peripheral 10 so as to communicate with the multifunction peripheral 10, to transmit the generation condition information, which is information indicating at least some of the conditions for generating the operation screen. The web browser section 22 determines whether or not it is necessary to obtain the generation condition information from the another device, depending on whether or not the operation screen data obtained from the second web server section 24 includes the request destination information.

Note that the display format information includes, for example, partial image data, partial image size information, character font information, character size information, partial image color information, character color information, and partial image and text layout information or some of these pieces of information. Examples of the generation condition information encompass information indicating a list of a device, a file, or an application program which are available in the multifunction peripheral 10 at the point in time when a request destination indicated in the request destination information receives the transmission request.

In a case where the web browser section 22 determines, in S4, that it is necessary to obtain the information (generation condition information) from the external application section 54, the web browser section 22 transmits, to the information processing device 50 via the second communication section 16, a request (HTTP Get command) for transmission of the information (S5). Specifically, the web browser section 22 requests the request destination to transmit the generation condition information, which request destination is indicated in the request destination information included in the operation screen data obtained from the second web server section 24 in S3. Note that the present embodiment is not limited to this but can employ such a configuration that request destination information (a request destination address and generation condition information, transmission of which is to be requested) is associated in advance with an application selection button to be selected in S1 and the web browser section 22 requests a request destination, corresponding to the application selection button, to transmit the generation condition information.

Upon receipt of the transmission request (S21), the first web server section 53 in the information processing device 50 obtains information from the external application section 54 in accordance with the transmission request and then responds (replies) to the multifunction peripheral 10 (S22). The web browser section 22 in the multifunction peripheral receives the information which is transmitted, as a response, from the information processing device 50 via the second communication section 16 (S6).

Subsequently, the web browser section 22 transmits, to the control application section 23, (i) the operation screen data obtained by the web browser section 22 from the second web server section 24 in S3 (in a case of No in S4) or (ii) image data of the operation screen, which image data has been generated on the basis of the operation screen data obtained by the web browser section 22 from the second web server section 24 in S3 and the generation condition information received from the information processing device 50 in S6 (in a case of Yes in S4). In response to this, the control application section 23 transmits, to the device control section 21, a control command for causing an operation screen to be displayed in the displaying section 12b in accordance with the image data of the operation screen, so that the operation screen is displayed in the displaying section 12b in accordance with the image data (S7).

Figure 5:
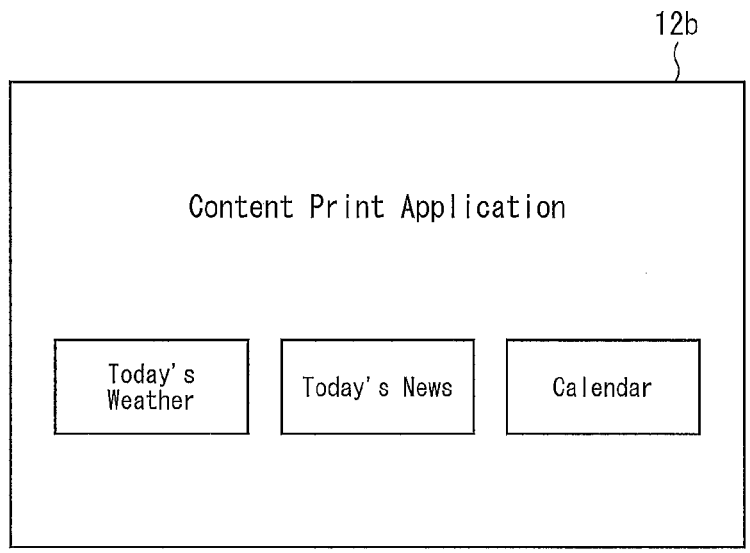
FIG. 5 is an explanatory view illustrating an example of an operation screen displayed in a displaying section of a multifunction peripheral illustrated in FIG. 1.
Figure 6:
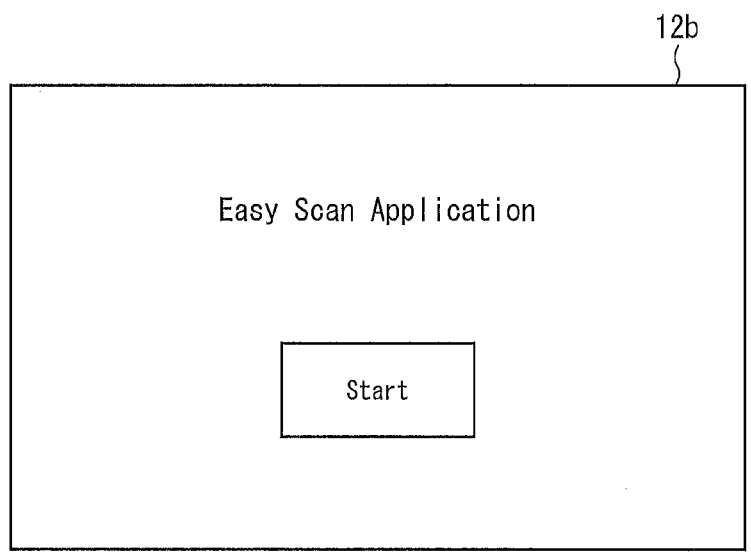
FIG. 6 is an explanatory view illustrating an example of an operation screen displayed in a displaying section in a multifunction peripheral illustrated in FIG. 1.

In the present embodiment, an operation screen of each of the "Content print application" and the "Easy scan application," out of the applications displayed in the operation screen illustrated in FIG. 3, can be displayed on the basis of the operation screen data stored in the external application UI storage section 15a, without communicating with the information processing device 50. As such, in a case where "Content print application" or "Easy scan application" is selected in the operation screen illustrated in FIG. 3, the web browser section 22 (i) obtains, from the second web server section 24, operation screen data which is stored in the external application UI storage section 15a and corresponds to a selected application and (ii) transmits image data of an operation screen to the control application section 23 in accordance with the operation screen data. The control application section 23 transmits, to the device control section 21, a control command for causing an operation screen to be displayed in the displaying section 12b in accordance with the image data. This causes the operation screen to be displayed in the displaying section 12b in accordance with the image data. FIG. 5 is an explanatory view illustrating an operation screen displayed in a case where "Content print application" is selected in the operation screen illustrated in FIG. 3. FIG. 6 is an explanatory view illustrating an operation screen displayed in a case where "Easy scan application" is selected in the operation screen illustrated in FIG. 3.

In the present embodiment, an operation screen of the "Anywhere print application", out of the applications displayed on the operation screen illustrated in FIG. 3, is displayed on the basis of (i) the display format information included in the operation screen data stored in the external application UI storage section 15a and (ii) the generation condition information obtained by the web browser section from the information processing device 50. Note that "Anywhere print application" is an application in which (i) printed character data is obtained from another device, which is connected to the multifunction peripheral 10 via the network so as to communicate with the multifunction peripheral 10 and (ii) an image is printed on a recording material in accordance with the printed character data. In a case where "Anywhere print application" is selected, the web browser section 22 obtains, from the second web server section 24, operation screen data which is stored in the external application UI storage section 15a and corresponds to "Anywhere print application". The web browser section 22 (i) requests, on the basis of request destination information included in obtained operation screen data, the information processing device 50 (the first web server section 53) to transmit generation condition information and (ii) receives the generation condition information transmitted, as a response, from the information processing device 50. The web browser section 22 (i) generates image data of the operation screen on the basis of (a) display format information included in the operation screen data obtained from the second web server section 24 and (b) the generation condition information obtained from the information processing device 50 and (ii) transmits the image data to the control application section 23. The control application section 23 transmits, to the device control section 21, a control command for causing an operation screen to be displayed in the displaying section 12b in accordance with the image data. This causes the operation screen to be displayed in the displaying section 12b in accordance with the image data.

FIG. 7 is an explanatory view showing a part of operation screen data (HTML data) which is obtained by the web browser section 22 from the external application UI storage section 15a via the second web server section 24 in a case where "Anywhere print application" is selected in the operation screen illustrated in FIG. 3. Function WindowOnLoad indicated in the HTML data is a function executed when the browser reads the HTML data. In an example shown by FIG. 7, the function WindowOnLoad calls function requestFileList. The function requestFileList dynamically generates a <script> tag in JavaScript and generates a process of request to the first web server section 53 by means of an HTTP Get command. Upon receipt of the request, the first web server section 53 returns a response which calls JavaScript function updateList for generating a file list. This causes function updateList, which has been written in advance in the HTML data, to be executed, so that image data of an operation screen, to which the content of the file list is reflected, is generated.

Figure 8:
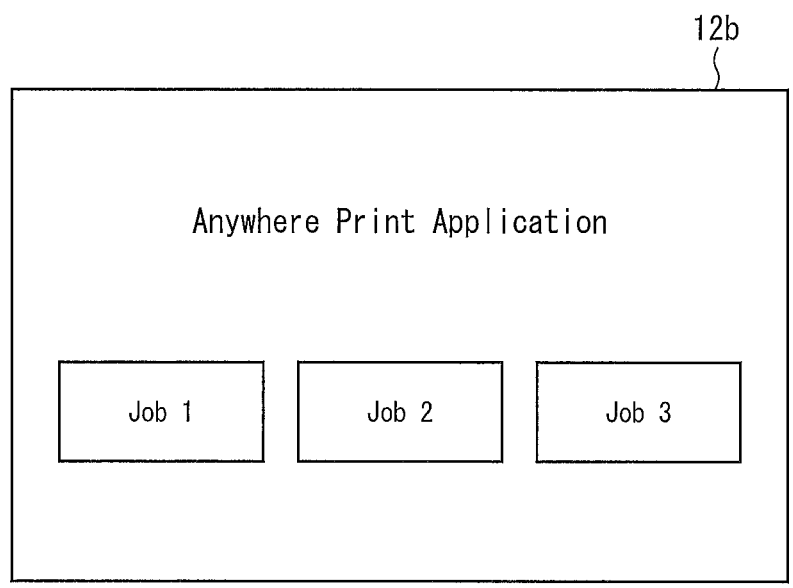
FIG. 8 is an explanatory view illustrating an example of an operation screen displayed in a displaying section of a multifunction peripheral illustrated in FIG. 1.

FIG. 8 is an explanatory view illustrating a part of an operation screen generated and displayed on the basis of (i) the display format information included in the operation screen data obtained by the web browser section 22 from the second web server section 24 and (ii) the generation condition information obtained by the web browser section 22 from the information processing device 50, in a case where "Anywhere print application" is selected in the operation screen illustrated in FIG. 3. In FIG. 8, the generation condition information obtained by the web browser section 22 from the information processing device is exemplified as a generation condition information which includes a file list indicating that printed character data which can be currently obtained by the multifunction peripheral 10 is "job 1," "job 2," and "job 3." The web browser section 22 generates, on the basis of the file list and the display format information which is included in the operation screen data obtained from the second web server section 24, an operation screen containing operation buttons for selecting respective items "job 1," "job 2," and "job 3."

Subsequently, the device control section 21 receives an operation input inputted to the operation screen, displayed in S7, by the user via the input section 12a (S8) and transmits the operation input to the web browser section 22. The web browser section 22 determines whether or not the operation input makes it necessary to require the external application section 54 for information (S9). In so doing, the web browser section 22 can determine on the basis of, for example, whether or not information (e.g., a request destination address) for requesting the external application section 54 to transmit information is associated with an operation button selected by the user in S8.

In a case where the web browser section 22 determines that the operation input from the user makes it necessary to request the external application section 54 for information, the web browser section 22 requests (HTTL request) the information processing device 50, via the second communication section 16, to transmit information in accordance with the operation input (S10). Specifically, in the HTML data of the operation screen shown in S7, a URL (in this case, an address for requesting the first web server section 53 in the information processing device 50 to transmit information) for making a request for transmission of information corresponding to a selection made by the user in S8 is associated with the operation button selected by the user. The web browser section 22 requests the first web server section 53 in the information processing device 50 to transmit the information on the basis of the URL.

Upon receipt of the transmission request (S23), the first web server section 53 in the information processing device obtains, from the external application section 54, information corresponding to the request for transmission and then responds (replies) to the multifunction peripheral 10 (S24). The web browser section 22 in the multifunction peripheral 10 receives the information transmitted, as a response, from the information processing device 50 via the second communication section 16 (S11).

For example, in a case where an operation button "Today's weather" or an operation button "Today's news" is selected in the operation screen illustrated in FIG. 5, the web browser section 22 request a request destination, associated with the operation button, to transmit information (weather information or news information) corresponding to the operation button. Note that information on a calendar is stored in the storage section 15 in the multifunction peripheral 10. In a case where an operation button "calendar" is selected in the operation screen illustrated in FIG. 5, the web browser section 22 accesses an address, of the second web server section 24, associated with the operation button and obtains information on the calendar.

A request destination, to which a request for transmission of a scanning condition is to be made, is associated with an operation button "start" in the operation screen illustrated in FIG. 6. In a case where the operation button "start" is selected, the web browser section 22 requests the request destination for transmission of the scanning condition.

A request destination, to which a request for transmission of each of the print character data "job 1," "job 2," and "job 3" is to be made, is associated with a corresponding one of the operation buttons for selecting the respective print character data "job 1," "job 2," and "job 3" in the operation screen illustrated in FIG. 8. In a case where any one of the operation buttons is selected, the web browser section 22 requests a request destination, which is associated with a selected operation button, to transmit a corresponding one of the printed character data.

Subsequently, the web browser section 22 determines (i) whether or not the operation input received in S8 requires execution of a job (in a case of No in S9) or (ii) whether or not the information received from the information processing device 50 in S11 requires execution of a job (in a case of Yes in S9) (S12).

In a case where the web browser section 22 determines, in S12, that the operation input or the information requires execution of a job, the web browser section 22 causes the device control section 21 to execute a job as required (S13) and determines whether or not to finish the process (S14).

In contrast, in a case where the web browser section 22 determines, in S12, that the operation input or the information does not require execution of a job or in a case where the web browser section 22 determines, in S14, to not finish the process, the web browser section 22 determines whether or not updating of the operation screen is necessary (S15). In a case where the updating is unnecessary, the web browser section 22 returns to S7 so as to cause the device control section 21 to continue to display the operation screen which has been displayed since previous S7.

In contrast, in a case where the updating is necessary, the web browser section 22 causes the device control section to update the image data of the operation screen in accordance with the operation input received in S8 and/or in accordance with the information received in S11 (S16), and returns to S7 so as to cause an operation screen to be displayed in accordance with the image data. Specifically, in the operation screen data of the operation screen displayed in S7, information indicating an access destination to be accessed in order to request operation screen data of a next operation screen is associated with an operation button, selected by the user in S8, for making a request for the operation screen data of the next operation screen. The web browser section 22 obtains the operation screen data of the next operation screen in accordance with the information and causes the device control section 21 to carry out displaying in accordance with the operation screen data.

In a case where the information processing device 50 gives a job execution order to the multifunction peripheral 10 in the present embodiment, the first web server section 53 in the information processing device 50 transmits, to the multifunction peripheral 10, an HTTP response for changing the access destination of the web browser section 22 into an address, which is in the second web server section 24 inside the multifunction peripheral 10, for obtaining a control command for causing the multifunction peripheral 10 to carry out a job function in accordance with the job execution order. This allows the web browser section 22 in the multifunction peripheral 10 to control the various functions of the multifunction peripheral 10 in accordance with the control command obtained from the control application section 23 inside the multifunction peripheral 10, not in accordance with a control command transmitted from the information processing device 50. As a result, even in a case where a firewall for blocking a communication of a control command has been set up between the multifunction peripheral 10 and the information processing device 50, the multifunction peripheral 10 can properly control various functions by obtaining a control command in accordance with an HTTP response received from the information processing device 50.

A process for changing the access destination of the web browser section 22 into the second web server section 24 inside the multifunction peripheral 10 can be achieved by, for example, writing, in the HTTP response, information indicating an access destination for causing the web browser section 22 to access the second web server section 24 inside an the multifunction peripheral 10.

In order to cause the web browser section 22 to access the second web server section 24 inside the multifunction peripheral 10, an HTTP response including an instruction for causing a URL to be changed by use of HTTP redirect can be transmitted to the multifunction peripheral 10. The HTTP redirect is a type of a response from a web server in HTTP used in transmission and reception of data and is a function for notifying that a URL has been changed. The HTTP redirect is a well-known function used in a widely used web browser. Examples of an HTTP redirect order encompass (a) an HTTP redirect response (e.g., a response code "3XX"), (b) an HTML (Hypertext Markup Language) refresh meta tag, and (c) a redirect style instruction ((i) an instruction to carry out a manual operation such as a button operation or (ii) an instruction to carry out an automatic redirect using JavaScript® or the like). The instruction using JavaScript® can be carried out by use of, for example, "location.href," a hidden in-line frame (hidden iframe), or JSONP (JavaScript Object Notification with padding).

Figure 9:
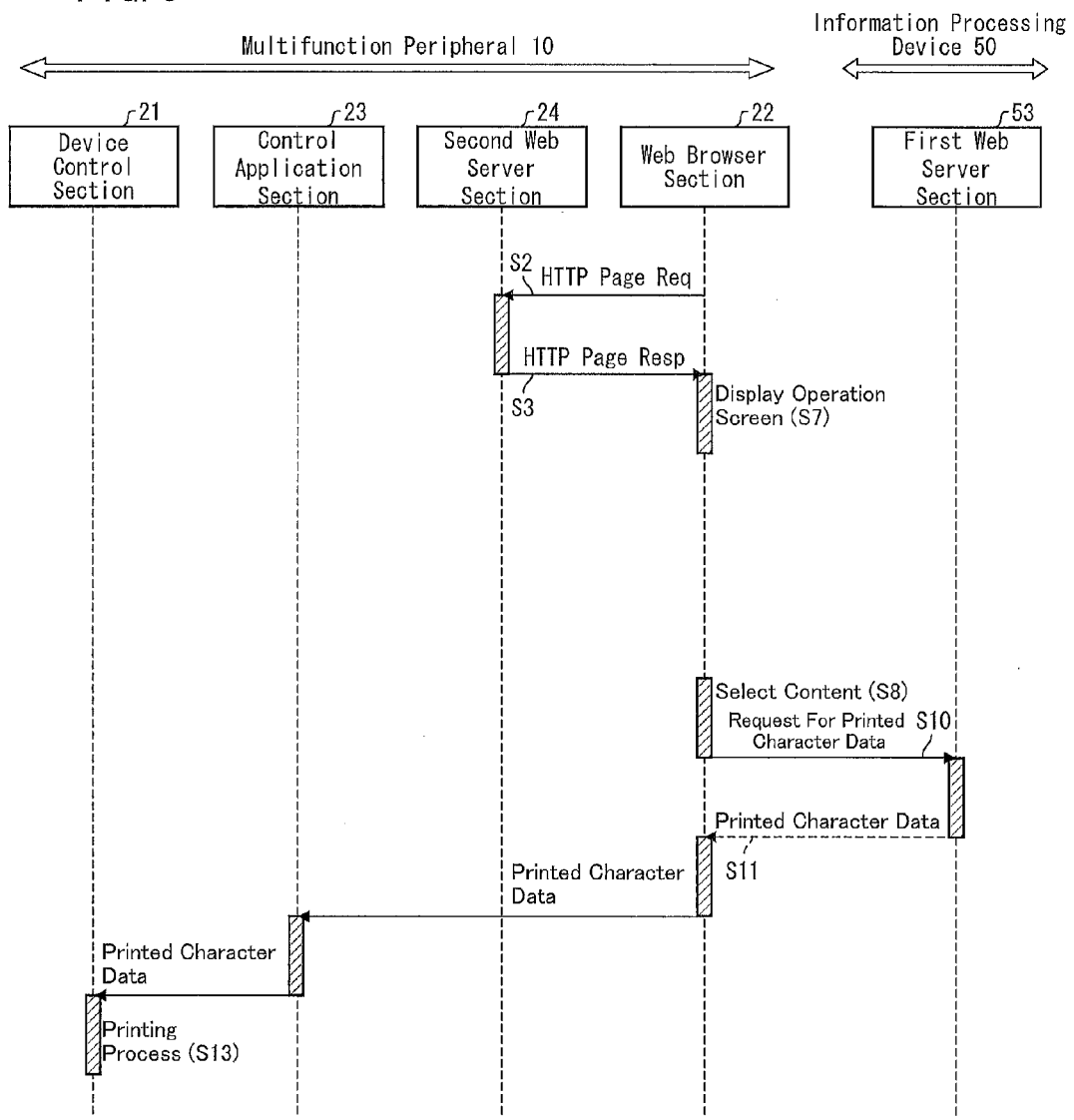
FIG. 9 is an explanatory view showing an example of a process sequence in a multifunction peripheral illustrated in FIG. 1.

FIG. 9 is an explanatory view illustrating a process sequence carried out in a case where (i) "Content print application" is selected in the operation screen illustrated in FIG. 3 and (ii) "Today's weather" or "Today's news" is selected in the operation screen illustrated in FIG. 5.

When "Content print application" is selected in the operation screen illustrated in FIG. 3, the web browser section 22 transmits, to the second web server section 24, a request (HTTP Page Request) for transmission of operation screen data (corresponding to S2 in FIG. 4) and obtains the operation screen data stored in the external application UI storage section 15a (corresponding to S3 in FIG. 4). The web browser section 22 notifies the control application section 23 of image data of an operation screen in accordance with the operation screen data obtained from the second web server section 24. This causes the control application section 23 to notify the device control section 21 of a control command for causing an operation screen to be displayed in the displaying section 12b in accordance with the image data, so that the operation screen (see FIG. 5) is displayed in the displaying section 12b (corresponding to S7 in FIG. 4).

Subsequently, when an operation input to the operation screen causes the operation button "Today's weather" or "Today's news" to be selected (corresponding to S8 in FIG. 4), the web browser section 22 requests, via the second communication section 16, a request destination to transmit printed character data corresponding to the operation button, which request destination is associated with the operation button (corresponding to S10 in FIG. 4). The web browser section 22 receives the printed character data (information indicating today's weather or information indicating today's news) which is transmitted from the request destination in response to request for transmission of the printed character data (corresponding to S11 in FIG. 4).

Upon receipt of the printed character data, the web browser section 22 transmits received printed character data to the control application section 23. The control application section 23 transmits, to the device control section 21, a control command for causing a printing process of the printed character data to be carried out. This causes the printing process to be carried out (corresponding to S13 in FIG. 4).

In a case where the operation button "calendar" is selected in the operation screen illustrated in FIG. 5, the web browser section 22 accesses an address, of the second web server section 24, associated with the operation button and obtains printed character data of a calendar, which printed character data has been stored in the storage section 15 in advance. The web browser section 22 transmits obtained printed character data to the control application section 23. The control application section 23 transmits, to the device control section 21, a control command for causing a printing process of the printed character data to be carried out. This causes the printing process of the calendar to be carried out.

Figure 10:
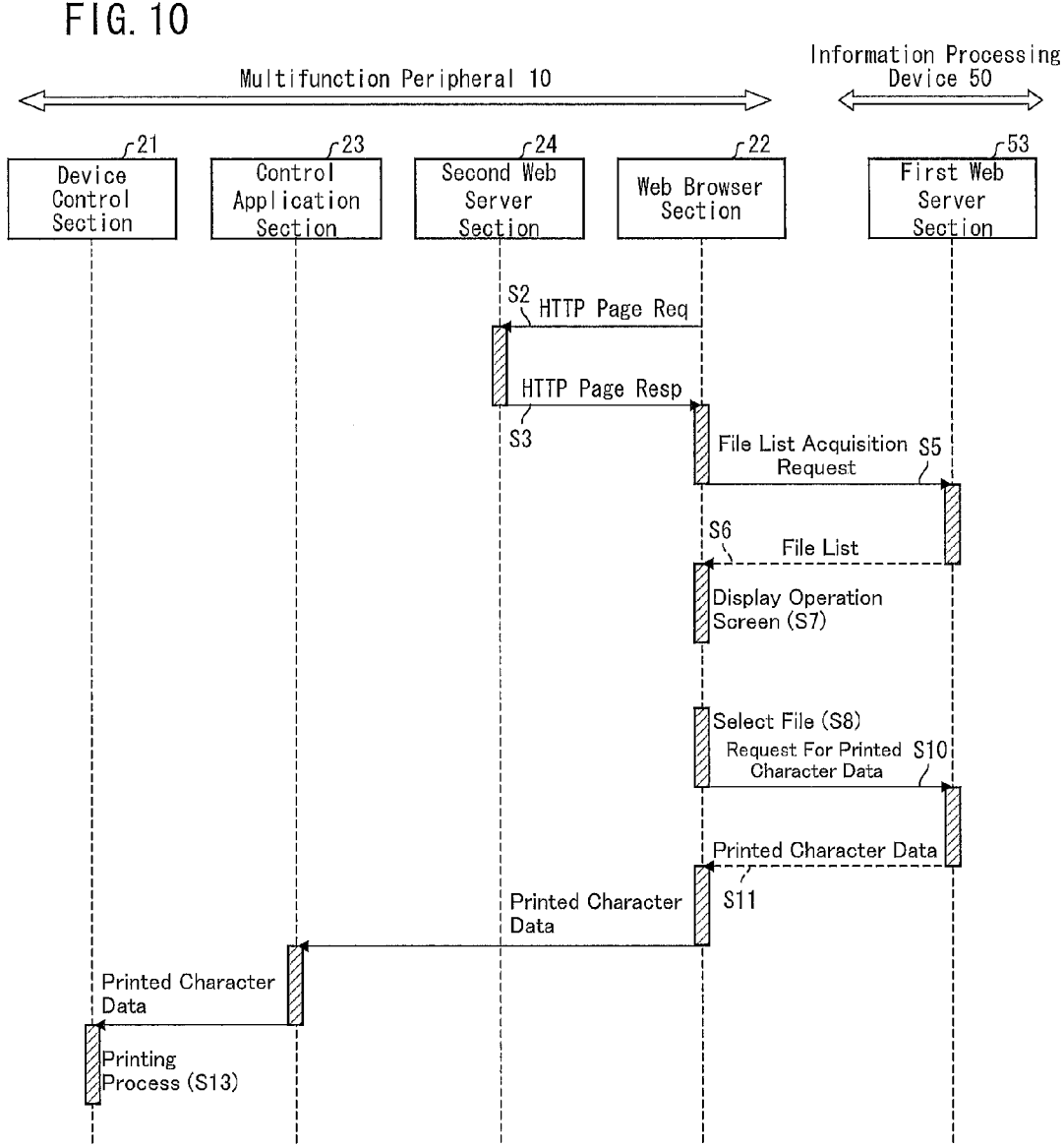
FIG. 10 is an explanatory view showing an example of a process sequence in a multifunction peripheral illustrated in FIG. 1.

FIG. 10 is an explanatory view showing a process sequence carried out in a case where "Anywhere print application" is selected in the operation screen illustrated in FIG. 3.

When "Anywhere print application" is selected in the operation screen illustrated in FIG. 3, the web browser section 22 transmits, to the second web server section 24, a request (HTTP Page Request) for transmission of operation screen data (corresponding to S2 in FIG. 4) and obtains the operation screen data stored in the external application UI storage section 15a (corresponding to S3 in FIG. 4). In this case, the operation screen data read out from the external application UI storage section 15a includes (i) display format information and (ii) request destination information of a destination to which a request for a file list (generation condition information) is to be made. The web browser section 22 transmits, to a request destination corresponding to the request destination information, a request for acquisition of the file list (corresponding to S5 in FIG. 4) and receives the file list which is transmitted from the request destination in response to the request (corresponding to S6 in FIG. 4). The web browser section 22 generates image data of an operation screen by combining the display format information included in the operation screen data and the file list obtained from the request destination, and notifies the control application section 23 of the image data. This causes the control application section 23 to notify the device control section 21 of a control command for causing an operation screen to be displayed in the displaying section 12b in accordance with the image data, so that the operation screen (see FIG. 8) is displayed in the displaying section 12b (corresponding to S7 in FIG. 4).

Subsequently, when an operation input to the operation screen causes any one of the operation buttons "job 1," "job 2," and "job 3" to be selected (corresponding to S8 in FIG. 4), the web browser section 22 makes, to a request destination via the second communication section 16, a request for transmission of printed character data, which request destination is associated with the operation button (corresponding to S10 in FIG. 4). The web browser section 22 receives the printed character data which is transmitted from the request destination in response to the request (corresponding to S11 in FIG. 4).

Upon receipt of the printed character data, the web browser section 22 transmits received printed character data to the control application section 23. The control application section 23 transmits, to the device control section 21, a control command for causing a printing process of the printed character data to be carried out. This causes the printing process to be carried out (corresponding to S13 in FIG. 4).

Figure 11:
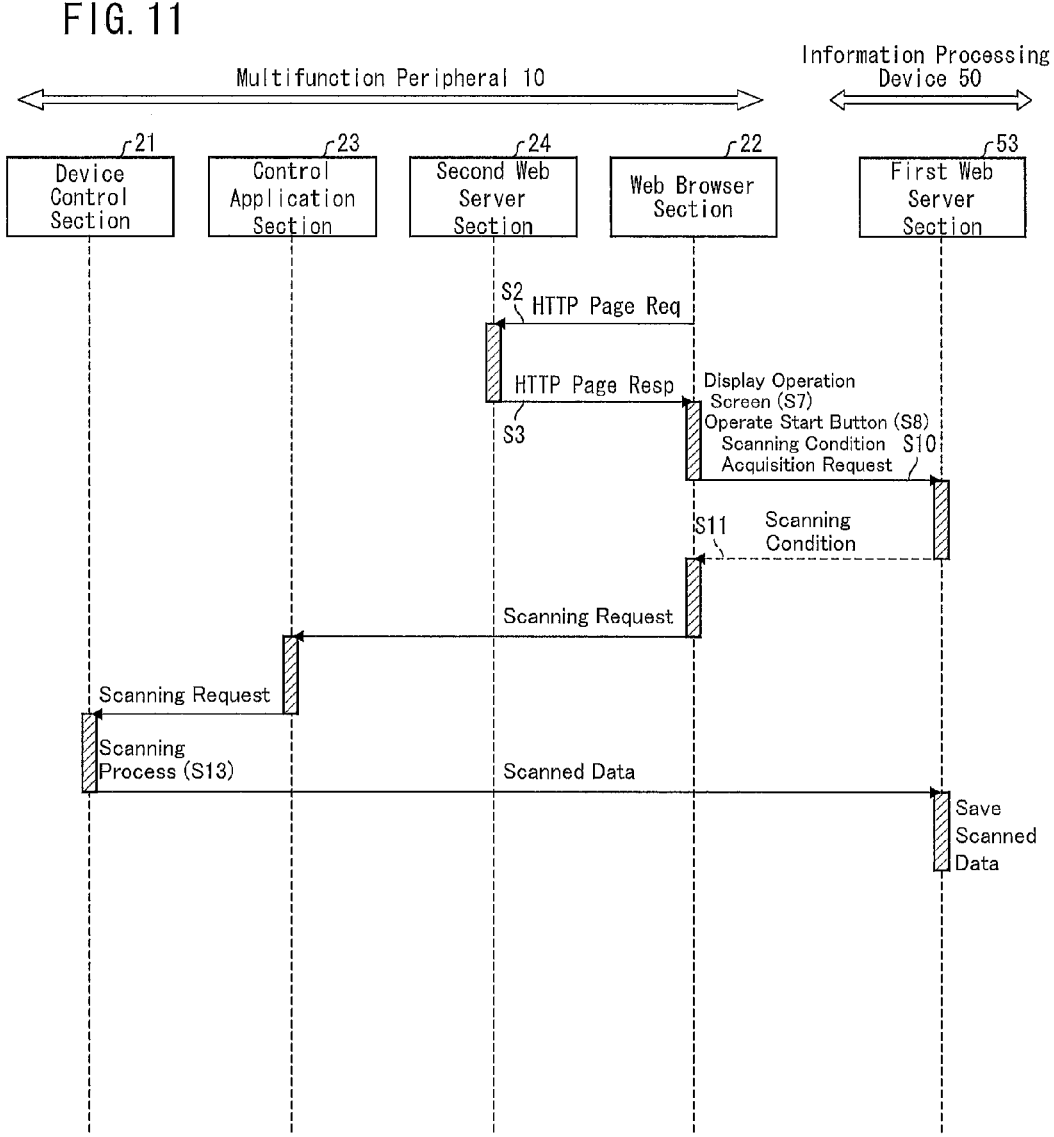
FIG. 11 is an explanatory view showing an example of a process sequence in a multifunction peripheral illustrated in FIG. 1.

FIG. 11 is an explanatory view illustrating a process sequence carried out in a case where "Easy scan application" is selected in the operation screen illustrated in FIG. 3.

When "Easy scan application" is selected in the operation screen illustrated in FIG. 3, the web browser section 22 transmits, to the second web server section 24, a request (HTTP Page Request) for transmission of an operation screen data (S2 in FIG. 4) and obtains the operation screen data stored in the external application UI storage section 15a (S3 in FIG. 4). The web browser section 22 notifies the control application section 23 of image data of an operation screen in accordance with the operation screen data obtained from the second web server section 24. This causes the control application section 23 to notify the device control section 21 of a control command for causing an operation screen to be displayed in the displaying section 12b in accordance with the image data, so that the operation screen (see FIG. 6) is displayed in the displaying section 12b (corresponding to S7 in FIG. 4).

Subsequently, when an operation input to the operation screen causes the operation button "start" to be selected (S8 in FIG. 4), the web browser section 22 makes, to a request destination via the second communication section 16, a request for transmission of information indicating a scanning condition, which request destination is associated with the operation button (S10 in FIG. 4). The web browser section 22 receives information, which indicates the scanning condition, transmitted from the request destination in response to the request (S11 in FIG. 4).

Upon receipt of the information indicating the scanning condition, the web browser section 22 transmits the information to the control application section 23. The control application section 23 transmits, to the device control section 21, a control command for causing a scanning process to be carried out in accordance with the information. This causes the scanning process to be displayed in accordance with the scanning condition transmitted from the information processing device 50 (the external application section 54) (S13 in FIG. 4). In an example illustrated in FIG. 11, the information indicating the scanning condition includes destination information of a destination to which read image data is to be transmitted. The device control section 21 controls the image reading section 13 to read image data and causes the image data to be transmitted to a destination via the second communication section 16 in accordance with the destination information, on the basis of the control command which the device control section 21 was notified of by the control application section 23.

As described above, in the multifunction peripheral 10 in accordance with the present embodiment, the web browser section 22 makes, to the second web server section 24, a request for acquisition of operation screen data of an application program executed in the information processing device 50, when the input section 12a receives an instruction to activate the application program. The second web server section 24 reads out the operation screen data of the application program from the external application UI storage section 15a in accordance with the request for acquisition and transmits the operation screen data of the application program to the web browser section 22 in response to the request for acquisition. The displaying section 12b displays an operation screen in accordance with the operation screen data obtained by the web browser section 22 from the second web server section 24.

Accordingly, even in a case where an application program executed in the external application section 54 in the information processing device 50 is utilized in the multifunction peripheral 10, operation screen data of the application can be obtained from the storage section 15 in the multifunction peripheral 10 itself, not from the information processing device 50. This reduces time required until an operation screen is displayed, so that the operation screen can be displayed quickly.

In the present embodiment, each section (each block) provided in the multifunction peripheral 10 and/or the information processing device 50, particularly the control section 11 of the multifunction peripheral 10 and/or the control section 51 of the information processing device 50 can be realized by means of software by use of a processor such as a CPU. In this case, the multifunction peripheral 10 and/or the information processing device 50 includes a CPU (Central Processing Unit) for executing commands of a control program for implementing each function, a ROM (Read Only Memory) in which the program is stored, a RAM (Random Access Memory) on which the program is loaded, a storage device (recording medium), such as a memory, in which the program and various data are stored, and the like. An object of the present invention is attained by the following procedures (i) and (ii): (i) loading, to printer 10 and/or the information processing device 50, the recording medium, in which program code (an executable program, an intermediate code program, and a source program) of the control program (software for implementing the functions) of printer 10 and/or the information processing device 50 is recorded so as to be read out by a computer and (ii) causing the computer (or a CPU or an MPU) to read out and execute the program code recorded in the recording medium.

For example, a tape such as a magnetic tape or a cassette tape, a disk including (i) a magnetic disk such as a Floppy® disk or a hard disk and (ii) an optical disk such as a CD-ROM, an MO, an MD, a DVD, or a CD-R, a card such as an IC card (including a memory card) or an optical card, a semiconductor memory such as a mask ROM, an EPROM, an EEPROM, or a flash ROM or the like can be used as the recording medium.

Further note that the multifunction peripheral 10 and/or the information processing device 50 can be configured so as to be capable of being connected to a communications network via which the program code is loaded to the multifunction peripheral 10 and/or the information processing device 50. The communications network is not limited to a specific one. The communications network can be, for example, an internet, an intranet, an extranet, a LAN, an ISDN, a VAN, a CATV communications network, a virtual private network, a telephone network, a mobile telecommunications network, a satellite communication network or the like. A transmission medium that constitutes the communications network is not limited to a specific one. The examples of the transmission medium encompass (i) wired communications such as IEEE1394, USB, a power-line carrier, a CATV line, a telephone line, or ADSL and (ii) wireless communications such as infrared communication by means of IrDA or remote control, Bluetooth®, 802.11 wireless, HDR, a mobile phone network, a satellite circuit, or a terrestrial digital network. Note that the present invention can be realized by employing a form of a computer data signal which is embedded in a carrier wave and is an embodiment of the program code in electronic transmission.

The each block of the multifunction peripheral 10 and/or the information processing device 50 is not limited to one that is realized by use of software. For example, the each block can be configured by (i) a hardware logic or (ii) a combination of hardware that carries out a part of a process and arithmetic means that executes software for controlling the hardware or a remaining process.

As described above, a multifunction peripheral of the present invention is a multifunction peripheral having a plurality of device functions and being connected to an information processing device via a communication network so as to communicate with the information processing device, the information processing device including a first web server section and an external application section which executes an application program, including: a displaying section for displaying an operation screen in accordance with operation screen data; an operation input section for receiving an instruction input from a user; a second web server section; a storage section for storing operation screen data of the application program executed in the information processing device; a web browser section; and a device control section for controlling an operation of each of the plurality of device functions, the web browser section making, to the second web server section, a request for acquisition of the operation screen data of the application program executed in the information processing device, when the operation input section receives an instruction to activate the application program, the second web server section (i) reading, from the storage section, the operation screen data of the application program in accordance with the request for acquisition and (ii) transmitting the operation screen data of the application program to the web browser section in response to the request for acquisition, the displaying section displaying an operation screen in accordance with the operation screen data obtained by the web browser section from the second web server section.

According to the configuration, when the operation input section receives an instruction to activate the application program, the web browser section makes, to the second web server section, a request for acquisition of the operation screen data of the application program, which is executed in the information processing device. The second web server section reads, from the storage section, the operation screen data of the application program in accordance with the request for acquisition and transmitting the operation screen data of the application program to the web browser section in response to the request for acquisition. The displaying section displays an operation screen in accordance with the operation screen data obtained by the web browser section from the second web server section. Accordingly, even in a case where an application program executed in the external application section in the information processing device is utilized in the multifunction peripheral, operation screen data of the application can be obtained from the storage section in the multifunction peripheral itself, not from the information processing device. This reduces time required until an operation screen is displayed, so that the operation screen can be displayed quickly.

It is possible to employ a configuration in which no communication with the information processing device is carried out after the operation input section receives the instruction to activate the application program executed in the information processing device and until the displaying section displays the operation screen in accordance with the operation screen data.

According to the configuration, it is possible to display the operation screen of the application program, which is executed in the information processing device, without communicating with the information processing device after the instruction to activate the application program is received. This allows the operation screen to be displayed more quickly.

It is possible to employ a configuration in which (i) the operation screen data includes (a) display format information, which is information indicating a display format of an operation screen and (b) request destination information, which is information for requesting another device, which is connected with the multifunction peripheral so as to communicate with the multifunction peripheral, to transmit generation condition information indicating at least some of conditions for generating an operation screen, (ii) the web browser section obtains the generation condition information from a request destination indicated in the request destination information, (iii) the displaying section displays an operation screen generated by combining the display format information included in the operation screen data and the generation condition information obtained from the request destination.

According to the configuration, it is possible to obtain, from the another device, the information indicating at least some of the conditions for generating the operation screen and obtain, from the storage section in the multifunction peripheral itself, the information indicating the display format of the operation screen. This allows communications traffic to be reduced as compared with a case in which both of the display format of and the generation condition of the operation screen are obtained from the information processing device. Accordingly, the operation screen can be quickly displayed.

It is possible to employ a configuration in which (i) the generation condition information is a list of a device, a file, and an application program which are available in the multifunction peripheral at the point in time when the request destination has received the transmission request and (ii) the displaying section includes, in the operation to be displayed, an image indicating an item included in the list.

According to the configuration, it is possible to (i) obtain, from the another device, the list of the device, the file, and the application program which are currently available and (ii) display the operation screen in accordance with (a) the operation screen data obtained from the second web server section and (b) the list obtained from the another device. This makes it possible to (i) display an operation screen to which the list of the device, the file, and the application program which are currently available and (ii) reducing communications with the outside.

It is possible to employ a configuration in which, in a case where (i) the operation input section receives an instruction input from a user to the operation screen of the application program and (ii) the instruction input requires the application program to make a request for transmission of a control instruction, the web browser section makes, to the first web server section, a request for transmission of a control instruction in accordance with the instruction input, and the device control section controls an operation of each of the plurality of device functions in accordance with the control instruction obtained by the web browser section from the first web server section.

According to the configuration, it is possible to (i) obtain, from the first web server section in the information processing device, a control instruction in accordance with an instruction input from the user and (ii) control an operation of each of the plurality of device functions in accordance with the control instruction.

It is possible to employ a configuration in which (i) a control command for causing the device control section to control an operation of each of the plurality of device functions is stored in the storage section, (ii) the web browser section makes, to the second web server section, a request for acquisition of a control command corresponding to the control instruction obtained from the first web server section, (iii) the second web server section reads out, from the storage section, a control command corresponding to the control instruction and transmits the control command to the web browser section in response to the request, and (iv) the device control section controls an operation of each of the plurality of device functions on the basis of the control command obtained by the web browser section from the second web server section.

According to the configuration, it is possible to use, as the web browser section, software for a widely used web browser and use, as the first web server section and the second web server section, software for a widely used web server. Therefore, even in a case where version upgrading of or changing of the web browser section, the first web server section, or the second web server section is carried out, it is unnecessary to extend software constituting the section. This makes it possible to improve maintenance efficiency.

It is possible to employ a configuration in which the control instruction transmitted from the first web server section to the web browser section can use an HTTP method including a loopback address or a redirect instruction which are for causing the web browser section to access an address, in the second web server section, for obtaining the control command corresponding to the control instruction.

According to the configuration, it is possible to use, as the web browser section, software for a generally used web browser. Data of the HTTP method can be transmitted from the information processing device to the multifunction peripheral, even in a case where a firewall has been set up between the information processing device and the multifunction peripheral. In addition, since the web browser section is provided in the multifunction, no firewall has been set up between the web browser section and the second web server section. Therefore, even in a case where a firewall has been set up between the information processing device and the multifunction peripheral, a control command can be specified on the basis of the loopback address or the redirect instruction which are included in the data of the HTTP method transmitted from the information processing device. This makes it possible to control a function of the multifunction peripheral from the information processing device.

It is possible to employ a configuration in which the web browser section uses the HTTP method in making, to the first web server section, the request for transmission of the control instruction.

According to the configuration, it is possible to use, as the web browser section, software for a widely used web browser.

The multifunction peripheral controlling system of the present invention includes: an information processing device including a first web server section and an external application section which executes an application program; and the multifunction peripheral connected with the information processing device via a communications network so as to communicate with the information processing device.

According to the configuration, even in a case where the application program executed in the external application section in the information processing device is utilized in the multifunction peripheral, operation screen data of the application can be obtained from the storage section in the multifunction peripheral itself, not from the information processing device. This reduces time required until an operation screen is displayed, so that the operation screen can be displayed quickly.

A method for controlling a multifunction peripheral of the present invention is a method for controlling a multifunction peripheral having a plurality of device functions and being connected to an information processing device via a communication network so as to communicate with the information processing device, the information processing device including a first web server section and an external application section which executes an application program, said multifunction peripheral including: a displaying section for displaying an operation screen in accordance with operation screen data; an operation input section for receiving an instruction input from a user; and a storage section for storing operation screen data of the application program executed in the information processing device, said method comprising the steps of: obtaining the operation screen data of the application program, which is executed in the information processing device, from the storage section when the operation input section receives an instruction to activate the application program; and causing an operation screen to be displayed in the displaying section in accordance with the operation screen data obtained from the storage section.

According to the method, even in a case where the application program executed in the external application section in the information processing device is utilized in the multifunction peripheral, operation screen data of the application can be obtained from the storage section in the multifunction peripheral itself, not from the information processing device. This reduces time required until an operation screen is displayed, so that the operation screen can be displayed quickly.

Note that the multifunction peripheral can be realized by means of a computer. In this case, (i) a program for causing the computer to operate as the web browser section and the second web server section so as to realize the multifunction peripheral by use of the computer and (ii) a computer-readable recording medium in which the program is recorded, are also included in the scope of the present invention The present invention is not limited to the above-described embodiments but allows various modifications within the scope of the claims. In other words, any embodiment obtained by combining technical means appropriately modified within the scope of the claims will also be included in the technical scope of the present invention.

INDUSTRIAL APPLICABILITY

The present invention can be applied to (i) a multifunction peripheral controlling system in which a multifunction peripheral and an information processing device, which are connected with each other via the communications network so as to communicate with each other, operate in collaboration with each other, (ii) a method for controlling the multifunction peripheral, and (iii) the multifunction peripheral provided in the multifunction peripheral controlling system.

REFERENCE SIGNS LIST

1: multifunction peripheral controlling system
10: multifunction peripheral
11: control section
12: operation section
12a: input section (operation input section)
12b: displaying section
13: image reading section
14: image forming section
15: storage section
15a: external application UI storage section
16: second communication section
21: device control section
21a: Open I/F section
22: web browser section
23: control application section
24: second web server section
30: communications network
50: information processing device
51: control section
52: first communication section
53: first web server section
54: external application section

The invention claimed is:

1. A multifunction peripheral having a plurality of device functions and which is programmed to be connected to an information processing device via a communication network so as to communicate with the information processing device, the information processing device including a first web server section and an external application section which is programmed to execute an application program, comprising:
- a displaying section programmed to display an operation screen in accordance with operation screen data;
- an operation input section for receiving an instruction input from a user;
- a second web server section;
- a storage section arranged to store operation screen data of the application program executed in the information processing device;
- a web browser section; and
- a device control section programmed to control an operation of each of the plurality of device functions,
- the web browser section programmed to make, to the second web server section, a request for acquisition of the operation screen data of the application program executed in the information processing device, when the operation input section receives an instruction to activate the application program,
- the second web server section (i) programmed to read, from the storage section, the operation screen data of the application program in accordance with the request for acquisition and (ii) programmed to transmit the operation screen data of the application program to the web browser section in response to the request for acquisition,
- the displaying section programmed to display an operation screen in accordance with the operation screen data obtained by the web browser section from the second web server section,
- no communication with the information processing device being carried out after the operation input section receives the instruction to activate the application program executed in the information processing device and until the displaying section displays the operation screen in accordance with the operation screen data,
- the web browser section making, in a case where (i) the operation input section receives an instruction input from a user to the operation screen of the application program and (ii) the instruction input requires the application program to make a request for transmission of a control instruction, a request to the first web server section for transmission of a control instruction in accordance with the instruction input,
- the device control section controlling an operation of each of the plurality of device functions in accordance with the control instruction obtained by the web browser section from the first web server section.

2. A multifunction peripheral controlling system comprising:
- an information processing device including a first web server section and an external application section which executes an application program; and
- a multifunction peripheral recited in claim 1, the multifunction peripheral being connected with the information processing device via a communications network so as to communicate with the information processing device.

3. A method for controlling a multifunction peripheral having a plurality of device functions and which is programmed to be connected to an information processing device via a communication network so as to communicate with the information processing device, the information processing device including a first web server section and an external application section which is programmed to execute an application program,
said multifunction peripheral comprising:
- a displaying section programmed to display an operation screen in accordance with operation screen data;
- an operation input section for receiving an instruction input from a user; and
- a storage section arranged to store operation screen data of the application program executed in the information processing device, said method comprising the steps of:
- obtaining the operation screen data of the application program, which is executed in the information processing device, from the storage section when the operation input section receives an instruction to activate the application program; and
- causing an operation screen to be displayed in the displaying section in accordance with the operation screen data obtained from the storage section,
- no communication between the multifunction peripheral and the information processing device being carried out after the instruction to activate the application program is received and until the displaying section displays the operation screen, said method further comprising the steps of:
- making, in a case where (i) the operation input section receives an instruction input from a user to the operation screen of the application program and (ii) the instruction input requires the application program to make a request for transmission of information in accordance with the instruction input, a request to the first web server section for transmission of the information in accordance with the instruction input;
- causing the operation input section to (i) obtain, from the external application section, information in accordance with the request for transmission and (ii) transmit the information to the multifunction peripheral; and
- controlling an operation of each of the plurality of device functions in accordance with the control instruction obtained by the web browser section from the first web server section.

4. A non-transitory computer-readable storage medium that stores a program for causing a multifunction peripheral recited in claim 1 to operate, the program being configured to cause a computer to function as a web browser section and a second web server section.

* * * * *